United States Patent
Wen (10) Patent No.: US 11,281,388 B2
(45) Date of Patent: Mar. 22, 2022

(54) METHOD FOR MANAGING A MULTI-SYSTEM SHARED MEMORY, ELECTRONIC DEVICE AND NON-VOLATILE COMPUTER-READABLE STORAGE MEDIUM

(71) Applicant: CLOUDMINDS (SHENZHEN) ROBOTICS SYSTEMS CO., LTD., Shenzhen (CN)

(72) Inventor: Yanfei Wen, Shenzhen (CN)

(73) Assignee: CLOUDMINDS (SHENZHEN) ROBOTICS SYSTEMS CO., LTD., Guangdong (CN)

( * ) Notice: Subject to any disclaimer, the term of this patent is extended or adjusted under 35 U.S.C. 154(b) by 79 days.

(21) Appl. No.: 16/784,613

(22) Filed: Feb. 7, 2020

(65) Prior Publication Data

US 2020/0174669 A1    Jun. 4, 2020

Related U.S. Application Data

(63) Continuation of application No. PCT/CN2017/096480, filed on Aug. 8, 2017.

(51) Int. Cl.
*G06F 12/00* (2006.01)
*G06F 3/06* (2006.01)

(52) U.S. Cl.
CPC .......... *G06F 3/064* (2013.01); *G06F 3/0604* (2013.01); *G06F 3/0659* (2013.01); *G06F 3/0673* (2013.01)

(58) Field of Classification Search
CPC ...... G06F 3/064; G06F 3/0604; G06F 3/0659; G06F 3/0673; G06F 12/0223; G06F 9/5016

USPC .......................................................... 711/147
See application file for complete search history.

(56) References Cited

U.S. PATENT DOCUMENTS

| | | | |
|---|---|---|---|
| 9,442,844 B2 | 9/2016 | Flynn et al. | |
| 2016/0011972 A1 | 1/2016 | Flynn et al. | |
| 2016/0239430 A1* | 8/2016 | Tsirkin | G06F 9/45558 |

FOREIGN PATENT DOCUMENTS

| | | |
|---|---|---|
| CN | 102929976 A | 2/2013 |
| CN | 102981964 A | 3/2013 |
| CN | 103425435 A | 12/2013 |
| CN | 106339258 A | 1/2017 |

(Continued)

OTHER PUBLICATIONS

International Search Report dated May 8, 2018; PCT/CN2017/096480.

(Continued)

*Primary Examiner* — Mardochee Chery (57) ABSTRACT

A method for managing a multi-system shared memory includes: upon receiving a data write instruction for writing data to the shared memory, acquiring a data size of to-be-written data that is to be written to the shared memory; judging whether the shared memory includes a data block that matches the data size and is idle; if the shared memory does not include the data block that matches the data size and is idle, acquiring a first data block that has a memory size greater than the data size and is idle, such that the to-be-written data is written to the first data block; acquiring a remaining idle space of the first data block after the to-be-written data is written to the first data block; and generating a new data block based on the remaining idle space.

20 Claims, 8 Drawing Sheets

(56) References Cited

FOREIGN PATENT DOCUMENTS

| CN | 106547625 A | 3/2017 |
|---|---|---|
| CN | 106980551 A | 7/2017 |

OTHER PUBLICATIONS

1st Office Action dated Jul. 19, 2021 by the CN Office; Appln.No. 201780002588.6.

* cited by examiner

METHOD FOR MANAGING A MULTI-SYSTEM SHARED MEMORY, ELECTRONIC DEVICE AND NON-VOLATILE COMPUTER-READABLE STORAGE MEDIUM

CROSS-REFERENCE TO RELATED APPLICATIONS

This application is a continuation of International Application No. PCT/CN2017/096480 with an international filing date of Aug. 8, 2017, the entire contents of which are incorporated herein by reference.

TECHNICAL FIELD

The present application relates to the technical field of virtualization, and in particular, relates to a method and apparatus for managing a multi-system shared memory.

BACKGROUND

With a further increase of the data volume and data processing demands, loads are imposing higher and higher requirements on performance of an operating system. Therefore, in today's mega data processing, a variety of operating systems are coming into people's life. Traditional computer-cluster systems to today's popular heterogeneous operating systems are all attempts in this field.

The main concept of a multi-operating system structure is to allocate different loads to kernels of different operating systems, to improve processing capabilities of the system and to be compatible with applications on different operating systems. With this design, all the kernels are independent in terms of computation, that is, these kernels independently process the loads. However, in terms of resource utilization, the operating systems share resources of the entire multi-operating system structure, for example, input/output, memory and the like.

With respect to the memory which is a resource of the multi-operating system structure, the conventional multi-operating system structure generally employ a mode of sharing the memory, that is, two non-related processes are allowed to access the same logic memory.

With respect to a shared memory, a typical design in the related art is as follows: if the shared memory is abstracted to a "memory band", a shared memory management application allocates, in accordance with a fixed front-to-back sequence, the memory of the "memory band" to kernel regions of various sub-operating systems using the number of blocks as a basic unit. That is, the sequence of occupying the memory by the kernel regions of the various sub-operating systems is from front to back in a fixed manner, and the memory allocated to the kernel regions may not be changed in the entire operation process of the multi-operating system.

The drawbacks of the above-mentioned related art are: the various sub-operating systems lack the ability of active memory awareness, and all shared memory management tasks are handled by the shared memory management application, which causes the shared memory allocation to be inflexible and easily cause waste of some shared memory. Thus, the shared memory cannot be fully and efficiently used.

SUMMARY

An embodiment of the present application provides a method for managing a multi-system shared memory. The method includes: upon receiving a data write instruction for writing data to the shared memory, acquiring a data size of to-be-written data that is to be written to the shared memory; judging whether the shared memory includes a data block that matches the data size and is idle; if the shared memory does not includes the data block that matches the data size and is idle, acquiring a first data block that has a memory size greater than the data size and is idle, such that the to-be-written data is written to the first data block; acquiring a remaining idle space of the first data block after the to-be-written data is written to the first data block; and generating a new data block based on the remaining idle space.

Another embodiment of the present application provides an electronic device. The electronic device includes: at least one processor; and a memory communicably connected to the at least one processor; wherein the memory stores an instruction program executable by the at least one processor, wherein, the instruction program, when being executed by the at least one processor, causes the at least one processor to perform the steps of: upon receiving a data write instruction for writing data to the shared memory, acquiring a data size of to-be-written data that is to be written to the shared memory; judging whether the shared memory includes a data block that matches the data size and is idle; if the shared memory does not include the data block that matches the data size and is idle, acquiring a first data block that has a memory size greater than the data size and is idle, such that the to-be-written data is written to the first data block; acquiring a remaining idle space of the first data block after the to-be-written data is written to the first data block; and generating a new data block based on the remaining idle space.

Still another embodiment of the present application provides a non-volatile computer-readable storage medium. The non-volatile computer-readable storage medium stores computer-executable instructions, which, when being executed by a computer, cause the computer to perform the steps of: upon receiving a data write instruction for writing data to the shared memory, acquiring a data size of to-be-written data that is to be written to the shared memory; judging whether the shared memory includes a data block that matches the data size and is idle; if the shared memory does not include the data block that matches the data size and is idle, acquiring a first data block that has a memory size greater than the data size and is idle, such that the to-be-written data is written to the first data block; acquiring a remaining idle space of the first data block after the to-be-written data is written to the first data block; and generating a new data block based on the remaining idle space.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

For clearer descriptions of the objectives, technical solutions, and advantages of the present application, the present application is further described with reference to specific embodiments and attached drawings. It should be understood that the specific embodiments described herein are only intended to explain the present application instead of limiting the present application.

It should be noted that, in the absence of conflict, embodiments of the present invention and features in the embodiments may be incorporated, which all fall within the protection scope of the present invention. In addition, although logic function module division is illustrated in the schematic diagrams of apparatuses, and logic sequences are illustrated in the flowcharts, in some occasions, steps illustrated or described by using modules different from the module division in the schematic diagrams of the apparatuses or in sequences different from those illustrated.

For better understanding of the present application by a person skilled in the art, the relevant technologies involved in the present application are described briefly hereinafter.

Virtualization is to abstract computer physical resources of, for example, servers, networks, RAMs, ROMs and the like, and convert the resources and finally present the resources, such that a user may use these resources in a mode better than original configurations. A virtualization portion of these resources is not limited by configuration of the conventional resources, geographic or physical configuration. In virtualization, a real physical environment is generally referred to as a host, and an environment established by virtualization is referred to as a guest. The operating system running on the host is referred to as a host operating system (host OS), and the operating system running on the guest is referred to as a guest operating system (guest OS). The layer responsible for virtualization is generally referred to as a virtual machine monitor (VMM).

Kernel-based virtual machine (KVM) is an open-source VMM. The concept of the KVM is to add a virtual machine management module based on the Linux kernel, and reuse process scheduling, memory management, I/O management and the like that have been perfected in the Linux kernel, such that the Linux kernel becomes a virtual machine management program supporting running of the virtual machine. Therefore, the KVM is not a complete emulator, and may be considered as a kernel plug-in which provides the virtualization function. Specific operation of the emulator needs to be carried out by virtue of a virtual operating system (QEMU). In the industry, incorporation of the QEMU and the KVM has been used as common virtualization implementation architecture. The QEMU is mainly used as an emulator, and the QEMU-KVM implements the virtualization function and practices virtualization of an entire system based on the hardware virtualization technology in combination with the QEMU.

In the embodiments of the present application, based on the QEMU-KVM virtualization architecture, a method for managing a multi-system shared memory according to the present application is implemented.

Figure 1:
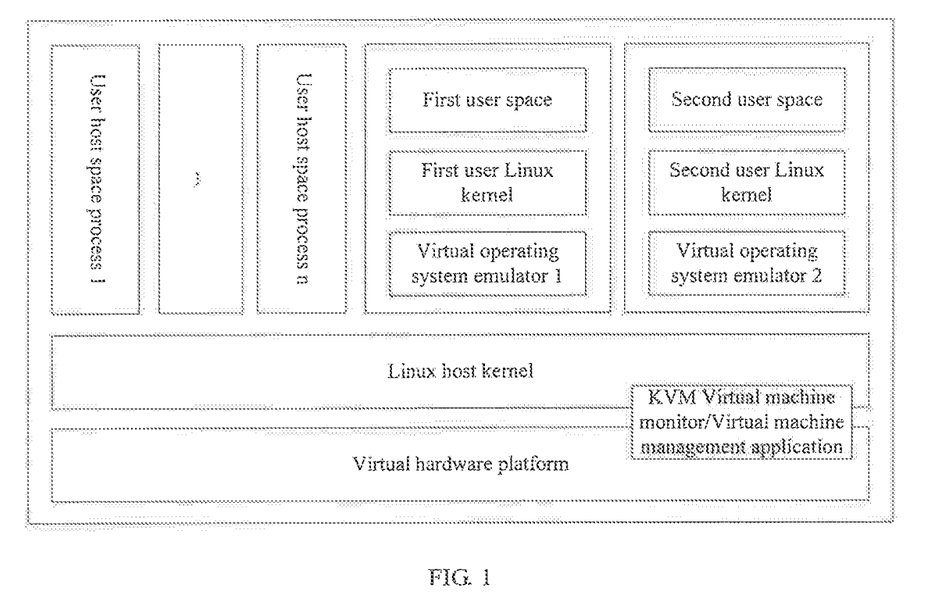
FIG. 1 is a schematic structural diagram of a virtualization solution based on QEMU-KVM according to an embodiment of the present application.

Specifically, as illustrated in FIG. 1, a virtualization scheme based on the QEMU-KVM technology is provided. This scheme includes a host operating system and several virtualized guest operating systems. These operating systems run on the same suite of hardware processor chip, and share the processor and peripheral resources. An ARM processor supporting the virtualization architecture mainly includes three modes. In a first mode, a virtual machine management program is run. In a second mode, a Linux kernel program is run. In a third mode, a user space program is run.

A virtual hardware platform is responsible for managing hardware resources such as a CPU, a memory, a timer, an interrupter and the like. By using virtualized resources of the CPU, the memory, the timer and the interrupter, different operating systems may be loaded to the physical processor in a time-division mode, such that the function of system virtualization is implemented.

A KVM virtual machine monitor/virtual machine management application layer crosses the Linux host kernel and the virtual hardware platform. In one aspect, the KVM virtual machine monitor/virtual machine management application layer provides a drive node for the QEMU. In another aspect, the KVM virtual machine monitor/virtual machine management application layer switches a Host Linux system out of the physical CPU, then loads a Guest Linux system to the physical processor, and finally processes subsequent affairs of exceptional exit of the Guest Linux system.

The QEMU, running as an application of the Host Linux system, provides virtual hardware device resources for running of the Guest Linux system, and a virtual CPU is created by using a device KVM node of the KVM virtual machine monitor/virtual machine management application layer, and physical hardware resources are allocated, such that a non-modified Guest Linux system is loaded on the physical hardware for running.

For implementing the above virtualization solution on smart terminal devices such as robots, mobile phones or tablet computers, the virtualization issue of all the hardware devices needs to be addressed, that is, allowing a virtualized operating system to use the physical hardware devices, for example, the memory, the interrupter resource, the timer, the network, the multimedia, the camera, the display and the like. Since a highly-efficient data transmission method may achieve an ideal virtualization effect for the devices, generally a method for sharing a memory among a plurality of systems is employed to solve the problem of virtualization of the hardware devices.

Therefore, the embodiments hereinafter provide a method and apparatus for managing a multi-system shared memory. The method is applied to the above QEMU-KVM virtualization architecture. The method and apparatus for managing a multi-system shared memory may fully utilize the shared memory, and improve data transmission efficiency, such that various smart terminal devices achieve an ideal virtualization effect.

Figure 2:
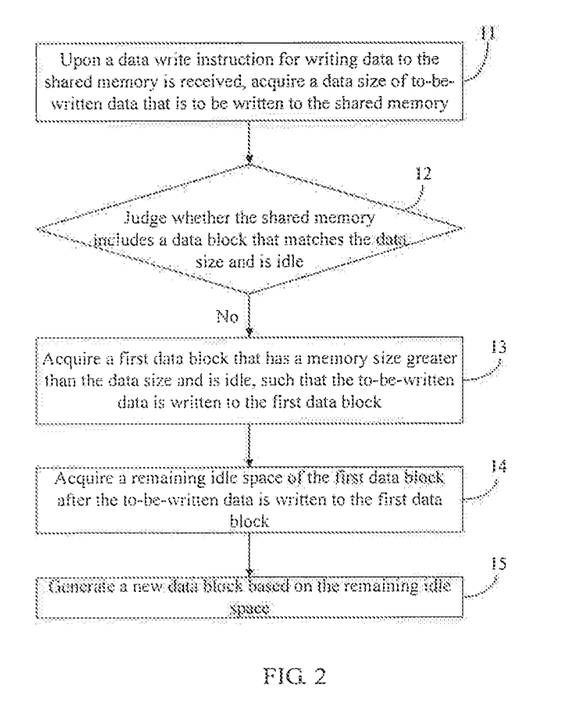
FIG. 2 is a schematic flowchart of a method for managing a multi-system shared memory according to an embodiment of the present application.

Referring to FIG. 2, FIG. 2 is a schematic flowchart of a method for managing a multi-system shared memory according to an embodiment of the present application. As illustrated in FIG. 2, the method includes the following steps:

Step 11: Upon a data write instruction for writing data to the shared memory is received, a data size of to-be-written data that is to be written to the shared memory is acquired.

When a virtual operating system which is to transmit data needs to transmit data to a target virtual system hosted on the same physical machine, the virtual operating system sends a data write instruction for writing data to the shared memory to a host operating system. In this case, a data size of data which is to be written to the shared memory may be acquired based on the data write instruction.

For example, when a virtual operating system A transmits data to a virtual operating system B (that is, the target virtual system), the virtual operating system A sends a data write instruction to the host operating system, and a shared memory management application included in the host operating system acquires a data size of the to-be-written data based on the received data write instruction. The data size of the to-be-written data is calculated by the virtual operating system A.

Step 12: Whether the shared memory includes a data block that matches the data size and is idle is judged.

Step 13: If the shared memory does not include a data block that matches the data size and is idle, a first data block that has a memory size greater than the data size and is idle is acquired, such that the to-be-written data is written to the first data block.

Step 14: A remaining idle space of the first data block is acquired after the to-be-written data is written to the first data block.

Step 15: A new data block is generated based on the remaining idle space.

Figure 3:
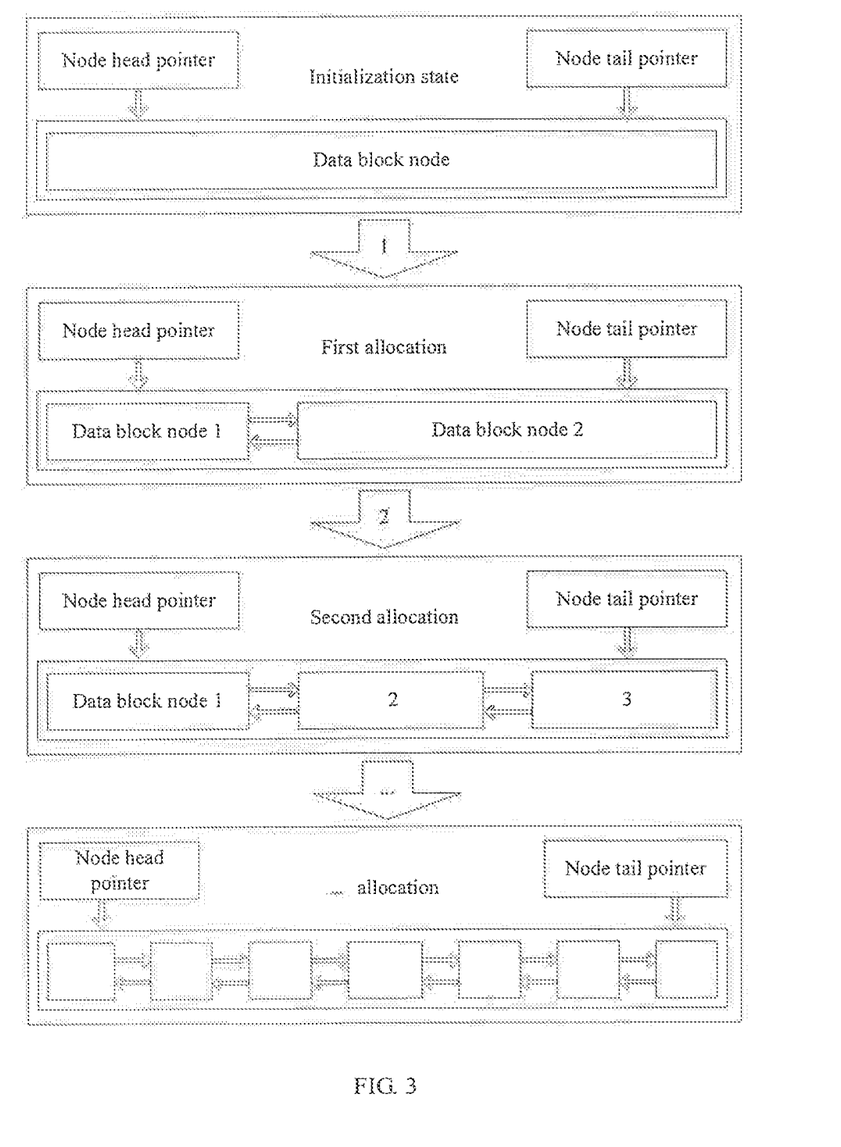
FIG. 3 is a schematic diagram a state when the shared memory is allocated in the method for managing a multi-system shared memory according to an embodiment of the present application.

In this embodiment, the above process is an allocation process of the shared memory. As illustrated in FIG. 3, based on a bidirectional link list-based data structure, a schematic diagram of a state when the shared memory is allocated is given.

Figure 4:
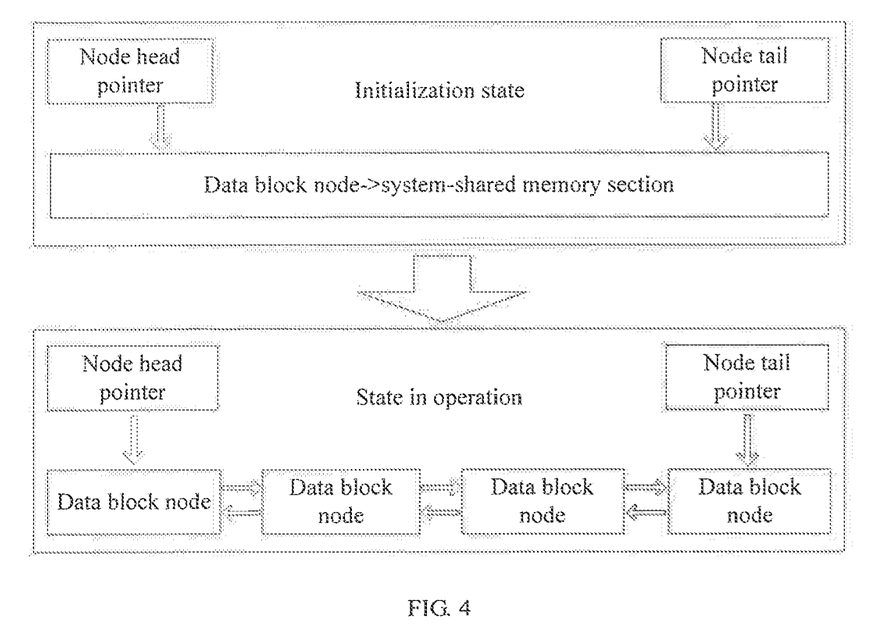
FIG. 4 is another schematic diagram of a state when the shared memory is allocated in the method for managing a multi-system shared memory according to an embodiment of the present application.

In an initialization state, as illustrated in FIG. 4, the shared memory has only one data block. Likewise as illustrated in FIG. 4, at an operating stage, allocation of the shared memory is carried out, and in this case, the shared memory includes at least two data blocks. Herein, a suitable data block is matched based on the data size of the to-be-written data. If the shared memory contains a data block whose memory size is just the same as the data size of the to-be-written data and that is idle at the same time, it indicates that the shared memory includes a data block that matches the data size is idle. In this case, the data block is directly acquired, and the to-be-written data is controlled to be written to the data block. If the shared memory does not contain a data block whose size is just the same as the data size of the to-be-written data and that is idle at the same time, a data block whose memory size is greater than the data size and is idle is acquired, and the to-be-written data is controlled to be written to the data block. In this case, the data block definitely contains the remaining idle space, and the remaining idle space is generated to a new data block. The new data block may be used by other processes to ensure that the shared memory is not wasted.

The size of the generated new data block is determined based on a mode of writing the to-be-written data to the first data block whose size is greater than the data size and that is idle. In this embodiment, the process of writing the to-be-written data to the first data block whose size is greater than the data size and that is idle specifically includes: based on the data size of the to-be-written data, the to-be-written data is controlled to be written to a contiguous address space of the first data block whose size is greater than the data size and that is idle. Herein, it is ensured that the data written to the first data block is contiguously stored in the address space of the first data block, such that the memory size of the generated new data block is as great as possible, to reduce storage fragments. For example, if a data block has a size of 10 KB, the to-be-written data has a size of 8 KB, and the 8 KB data is written to the contiguous address space of the first data block, the remaining idle space is 2 KB; and if the to-be-written data is written to the address space of the first data block from a header address or a tail address of the address space of the first data block, the size of the generated new data block is 2 KB.

Therefore, preferably, starting from the header address or the tail address of the address space of the data block, the to-be-written data is controlled to be written to the address space of the first data block. In this way, utilization rate of the shared memory is fully improved.

Figure 5:
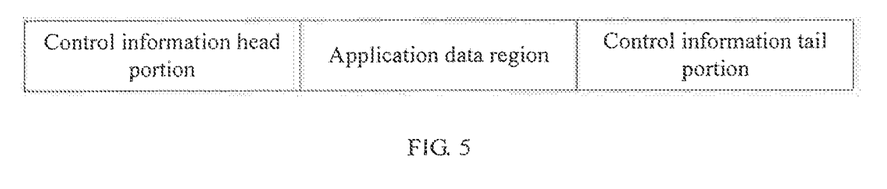
FIG. 5 is a schematic structural diagram of a data block in the method for managing a multi-system shared memory according to an embodiment of the present application.

When the data block nodes in the shared memory are managed by using the bidirectional link list, each data block node has a format as illustrated in FIG. 5. The data block node includes three regions:

a control information header portion, which is used to record information of the data blocks, such as states, sizes and the like in the shared memory;

an application data region, which is a region that is practically allocated to the Guest OS for data read and write; and a control information tail portion, which is used to mark the tail of a data node; wherein the Guest OS may not write out of this region, and this portion is mainly used to monitor out-of-range write of the Guest OS.

Figure 6:
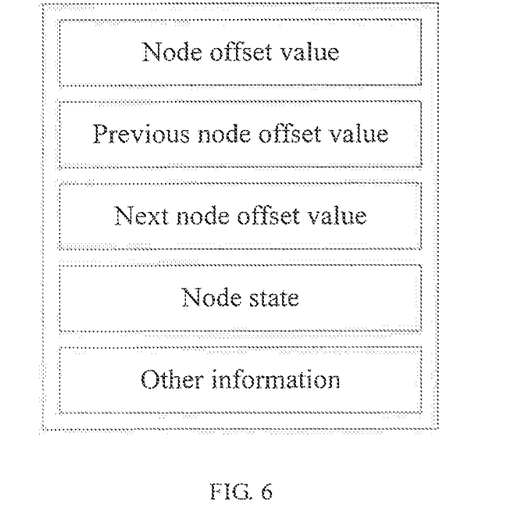
FIG. 6 is a schematic structural diagram of a control information header portion of a data block in the method for managing a multi-system shared memory according to an embodiment of the present application.

As illustrated in FIG. 6, the control information header portion mainly includes the following information fields: a node offset value for recording an offset amount of a data block node from a start position of the shared memory to a start position of the data block node; a previous node offset value for recording an offset value of a previous data block node of the data block node in the bidirectional link list of the data block node; a next node offset value for recording an offset value of a next data block node of the data block node in the bidirectional link list of the data block node; a node state for identifying that the data block node is currently in an idle state or an active state; and other information for recording length information, synchronization information and the like of the data block.

It should be noted that during allocation of the shared memory, a cyclic link list or other data structures may also be used to manage the data block nodes of the shared memory, which is not limited to the modes as illustrated in FIG. 3 and FIG. 4. When the other data structures are used, the format of each data block node matches the current data structure.

Figure 7:
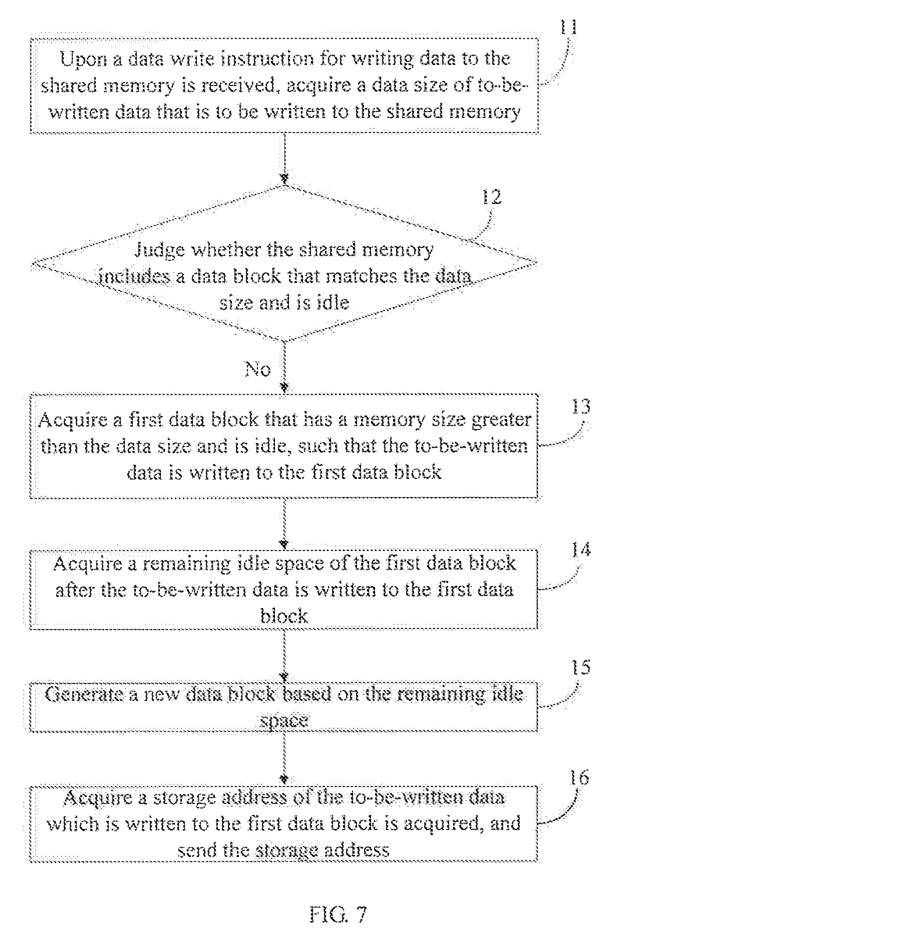
FIG. 7 is a schematic flowchart of another method for managing a multi-system shared memory according to an embodiment of the present application.

In some embodiments, as illustrated in FIG. 7, after the to-be-written data is written into the data block, the method further includes the following steps:

Step 16: A storage address of the to-be-written data which is written to the first data block is acquired, and the storage address is sent.

The storage address is a position of the to-be-written data in the first data block. Upon acquiring the storage address of the to-be-written data which is written to the first data block, the management application of the shared memory sends the storage address to the target virtual system, and the target virtual system reads the to-be-written data from the first data block based on the storage address, thereby completing data transmission.

Figure 8:
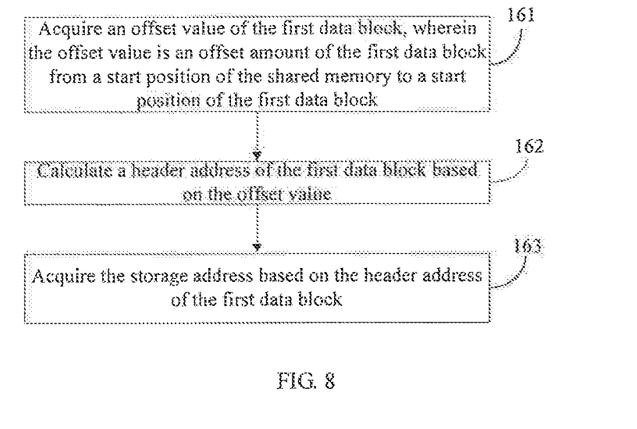
FIG. 8 is a schematic flowchart of a method for acquiring a storage address after to-be-written data is written to a first data block in the method for managing a multi-system shared memory according to an embodiment of the present application.

As illustrated in FIG. 8, the step of acquiring a storage address of to-be-written data which is written to the first data block specifically includes:

step 161: acquiring an offset value of the first data block, wherein the offset value is an offset amount of the first data block from a start position of the shared memory to a start position of the first data block;

step 162: calculating a header address of the first data block based on the offset value; and step 163: acquiring the storage address based on the header address of the first data block.

As known from the format of a data block node in FIG. 5, the offset value may be acquired based on the node offset value recorded in the control information header portion. After the offset value is acquired, a start node address of the shared memory is added to the offset value, such that the header address of the first data block is acquired. The storage address is an address of an application data region in a data block node, which may be a header address of the application data region, or may be a storage region defined by the header address and a tail address. Based on the header address of the first data block, the size of the data block recorded in the control information header portion and the like information, the storage address may be acquired.

This embodiment of the present application provides a method for managing a multi-system shared memory. In the method, a suitable shared memory is allocated to to-be-written data based on a data size of the to-be-written data; and when a memory size of an allocated data block is greater than the data size of the to-be-written data, a remaining idle space of the data block is acquired, and a new data block is generated based on the remaining idle space. According to this embodiment, utilization rate and flexibility of the shared memory are improved, and data transmission efficiency is improved by sufficiently improving the utilization date of the shared memory, such that system performance is entirely improved.

Figure 9:
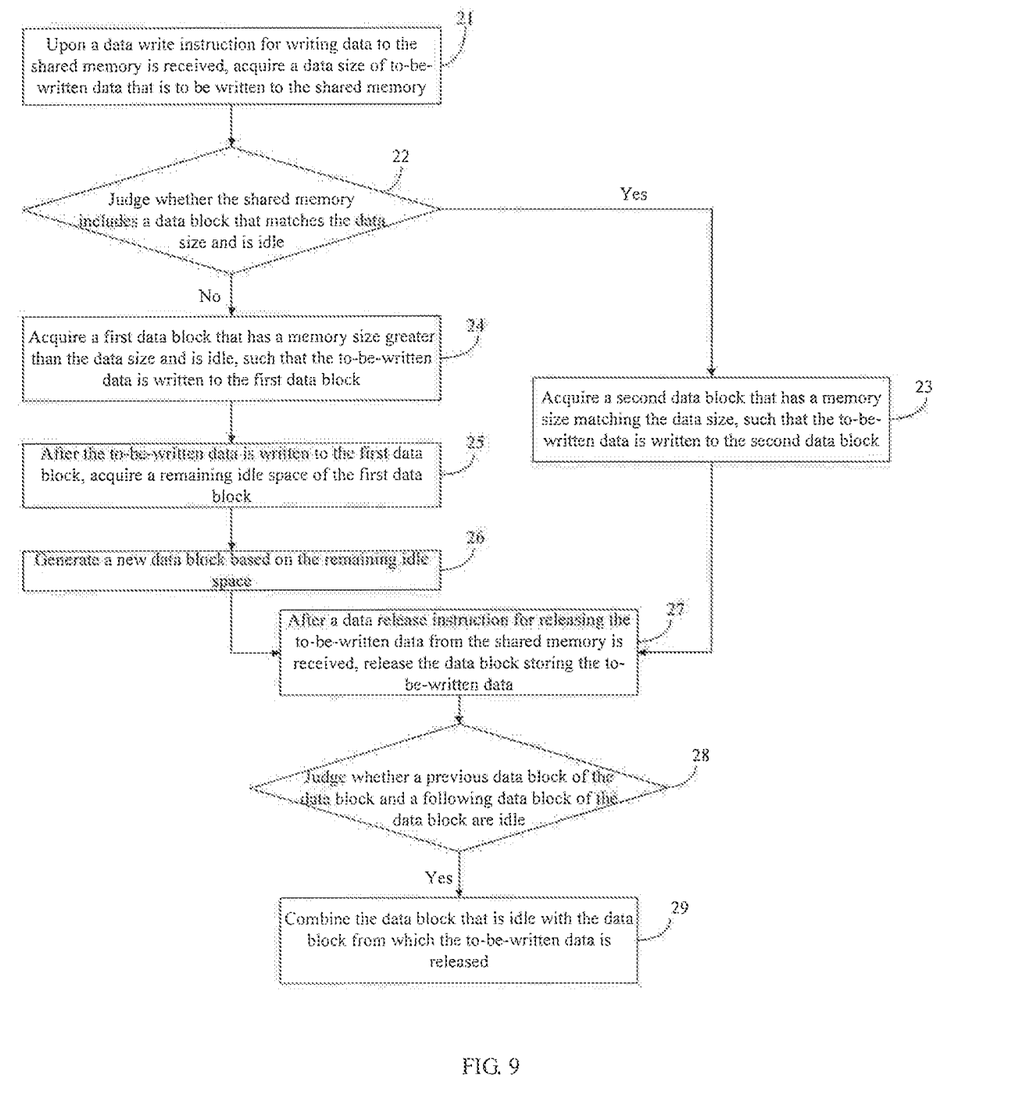
FIG. 9 is a schematic flowchart of a method for managing a multi-system shared memory according to an embodiment of the present application.

Referring to FIG. 9, FIG. 9 is a schematic flowchart of a method for managing a multi-system shared memory according to an embodiment of the present application. As illustrated in FIG. 9, the method includes the following steps:

Step 21: Upon a data write instruction for writing data to the shared memory is received, a data size of to-be-written data that is to be written to the shared memory is acquired.

Step 22: Whether the shared memory includes a data block that matches the data size and is idle is judged.

Step 23: If the shared memory includes a data block that matches the data size and is idle, a second data block that has a memory size matching the data size is acquired, such that the to-be-written data is written to the second data block.

Step 24: If the shared memory does not include a data block that matches the data size and is idle, a first data block that has a memory size greater than the data size and is idle is acquired, such that the to-be-written data is written to the first data block.

Step 25: After the to-be-written data is written to the first data block that has a memory size greater than the data size and that is idle, a remaining idle space of the first data block is acquired.

Step 26: A new data block is generated based on the remaining idle space.

Step 21 to step 26 may be referenced to the description in the above method embodiment, which are not detailed herein any further.

Step 27: After a data release instruction for releasing the to-be-written data from the shared memory is received, the data block storing the to-be-written data is released.

After the shared memory management application receives a data read completion instruction from the target virtual system, the shared memory is controlled to release the to-be-written data, or the shared memory management application proactively controls the shared memory to release the to-be-written data. The data block is the first data block or the second data block.

Step 28: Whether a previous data block of the data block and a following data block of the data block are idle is judged.

Step 29: The data block that is judged as idle is combined with the data block from which the to-be-written data is released.

Figure 10:
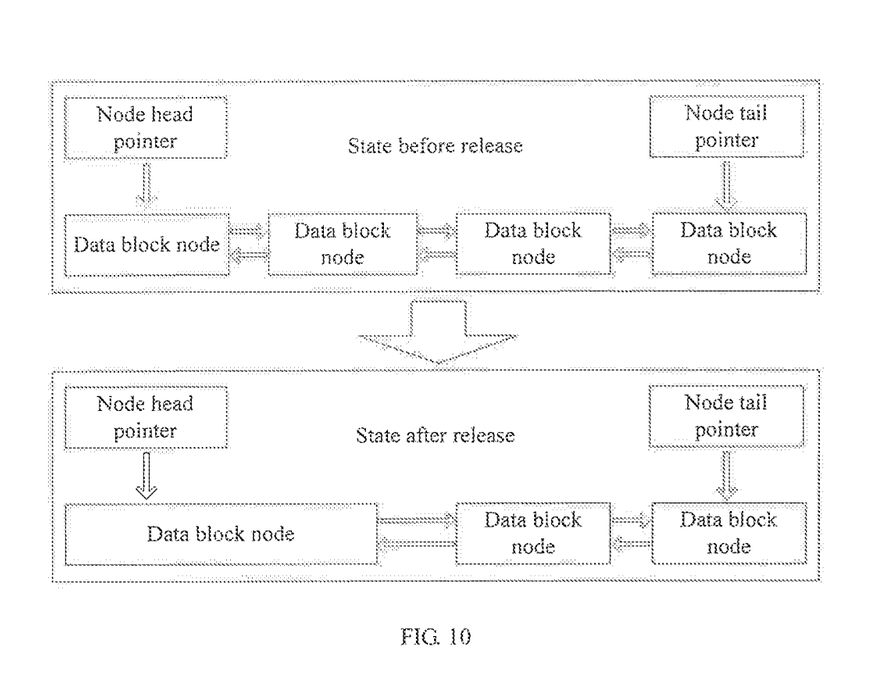
FIG. 10 is a schematic diagram of states before or after a data block is released in the method for managing a multi-system shared memory according to an embodiment of the present application.

While a storage space of a data block is released, whether a state of a previous data block of the data block is idle is judged, and whether a state of a next data block of the data block is idle is judged. If the previous data block is idle and the next data block is not idle, the previous data block and the data block are combined to one data block. If the next data block is idle and the previous data block is not idle, the next data block and the data block are combined to one data block. If the previous data block and the next data block are both idle, the previous data block, the next data block and the data block are combined to generate a new data block. As illustrated in FIG. 10, an entire process of releasing the data block is depicted.

It should be noted that the management method for a multi-system shared memory according to this embodiment of the present application may be applied to a data transmission process of the shared memory. Hereinafter, this process is described by an example.

For example, when a virtual operating system A transmits data to a virtual operating system B, firstly, the virtual operating system A sends a data transmission request instruction to a host operating system, wherein the host operating system includes a shared memory management application, and the shared memory management application acquires a data size of to-be-written data based on the received data transmission request instruction; and afterwards, the shared memory is allocated based on the data size of the to-be-written data, a suitable data block is acquired, and the to-be-written data is controlled to be written to the data block. In this process, if the allocated data block still has a remaining idle space, a new data block is generated based on the remaining idle space. After the to-be-written data is written to the data block, the shared memory management application calls a synchronization interface to notify the virtual operating system B that the data has been written to the data block. The virtual operating system B receives the notification and reads the data in the data blocks, and sends an acknowledgment message to the host operating system upon completion of reading the data. Based on the acknowledgment message, the shared memory management application calls a memory release function to release the data block which stores the data. In this process, if a previous data block or a next data block of the released data block is idle, the idle data block and the data block from each the data is released are combined. The data structure of the shared memory may be a bidirectional link list or a cyclic link list or another data structure.

In this embodiment, a suitable shared memory is allocated to to-be-written data based on a data size of the to-be-written data. If an allocated data block has a memory size greater than the data size of the to-be-written data, a remaining idle space of the data block is acquired, and a new data block is generated based on the remaining idle space. When data is released from the shared memory, the data block from each the data is released and an adjacent idle data block are combined. In one aspect, this embodiment improves utilization rate and flexibility of the shared memory, and enhances data transmission efficiency. In another aspect, time for allocating the memory at a next time may be reduced by combining the released data block, and memory allocation efficiency is improved.

Figure 11:
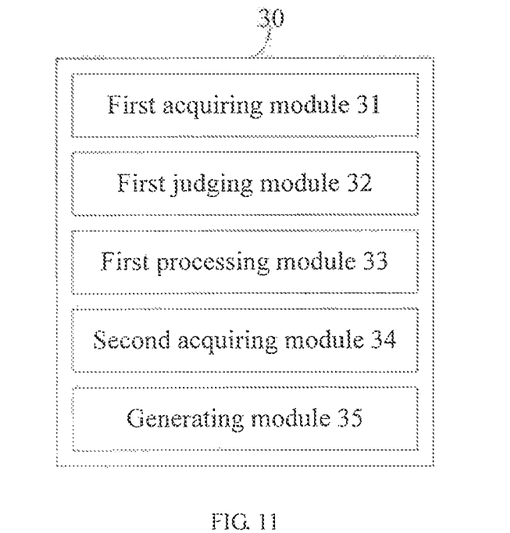
FIG. 11 is a schematic structural diagram of an apparatus for managing a multi-system shared memory according to an embodiment of the present application.

Referring to FIG. 11, FIG. 11 is a schematic structural diagram of an apparatus 30 for managing a multi-system shared memory according to an embodiment of the present application. As illustrated in FIG. 11, the apparatus 30 includes: a first acquiring module 31, a first judging module 32, a first processing module 33, a second acquiring module 34 and a generating module 35.

The first acquiring module 31 is configured to, upon receiving a data write instruction for writing data to the shared memory, acquire a data size of to-be-written data that is to be written to the shared memory. The first judging module 32 is configured to judge whether the shared memory includes a data block that matches the data size and is idle. The first processing module 33 is configured to, if the shared memory does not include the data block that matches the data size and is idle, acquire a first data block that has a memory size greater than the data size and is idle, such that the to-be-written data is written to the first data block. The second acquiring module 34 is configured to acquire a remaining idle space of the first data block after the to-be-written data is written to the first data block. The generating module 35 is configured to generate a new data block based on the remaining idle space.

The to-be-written data is written to an address space of the first data block, and the address space is a contiguous address space.

A header address of the contiguous address space is the same as a header address of the address space of the first data block, or a tail address of the contiguous address space is the same as a tail address of the address space of the first data block.

Figure 12:
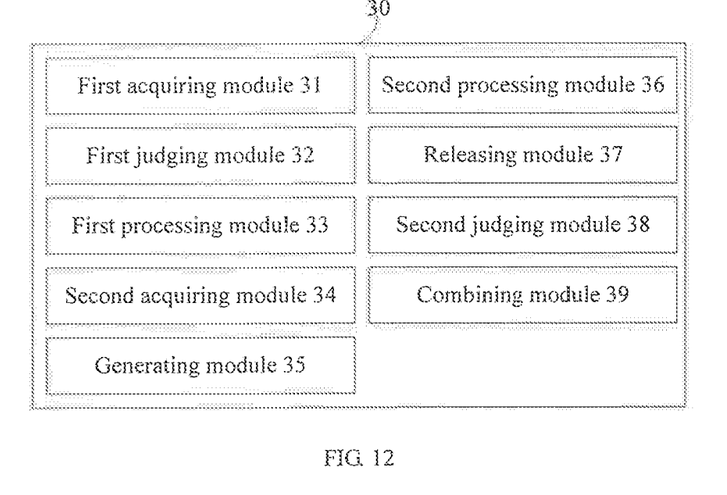
FIG. 12 is a schematic structural diagram of an apparatus for managing a multi-system shared memory according to an embodiment of the present application.

In some embodiments, as illustrated in FIG. 12, the apparatus 30 further includes: a second processing module 36, a releasing module 37, a second judging module 38 and a combining module 39.

The second processing module 36 is configured to, if the shared memory includes a data block that matches the data size and is idle, acquire a second data block that has a memory size matching the data size, such that the to-be-written data is written to the second data block. The releasing module 37 is configured to, upon receiving a data release instruction for releasing the to-be-written data from the shared memory, release the data block storing the to-be-written data. The second judging module 38 is configured to judge whether a previous data block of the data block and a following data block of the data block are idle. The combining module 39 is configured to combine the data block that is judged as idle with the data block from which the to-be-written data is released.

It should be noted that information exchange and execution procedures and the like content between various modules and units in the apparatus for managing a multi-system shared memory according to the embodiment of the present application are based on the same inventive concept as the method embodiments of the present application, and thus the corresponding content in the method embodiments is also applicable to the management apparatus for a multi-system shared memory.

This embodiment provides an apparatus for managing a multi-system shared memory. In the apparatus, a suitable shared memory is allocated to to-be-written data based on a data size of the to-be-written data; and when a memory size of an allocated data block is greater than the data size of the to-be-written data, a remaining idle space of the data block is acquired, and a new data block is generated based on the remaining idle space; and when data is released from the shared memory, the data block from each the data is released and an adjacent idle data block are combined. In one aspect, this embodiment improves utilization rate and flexibility of the shared memory, and enhances data transmission efficiency. In another aspect, time for allocating the memory at a next time may be reduced by combining the released data block, and memory allocation efficiency is improved.

Figure 13:
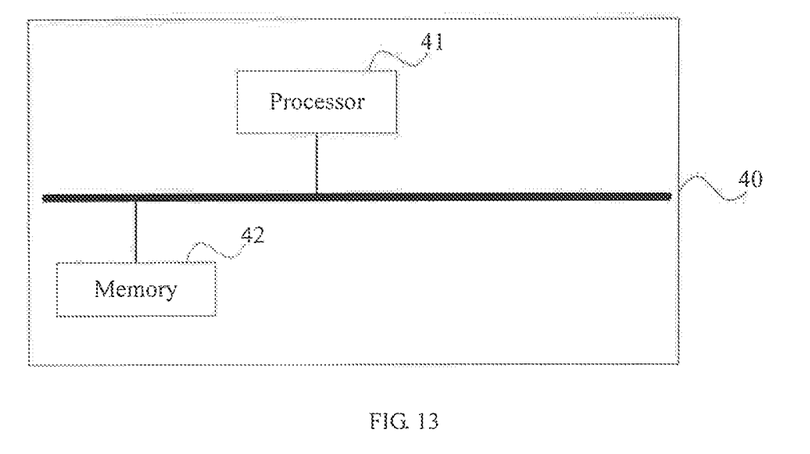
FIG. 13 is a schematic structural diagram illustrating hardware of an electronic device for performing the method for managing a multi-system shared memory according to an embodiment of the present application.

Referring to FIG. 13, FIG. 13 is a schematic structural diagram illustrating hardware of an electronic device 40 for performing the method for managing a multi-system shared memory according to an embodiment of the present application. The electronic device 40 is capable of performing the above method for managing a multi-system shared memory, and may be any suitable smart terminal device, for example, a smart robot, a robot assistant, a PDA, a personal computer, a tablet computer, a smart phone, a wearable smart device or the like.

Specifically, as illustrated in FIG. 13, the electronic device 40 includes at least one processor 41 and a memory 42, and FIG. 12 uses one processor 41 as an example.

The processor 41 and the memory 42 may be connected via a bus or in another manner, and FIG. 13 uses the bus as an example.

The memory 42, as a non-volatile computer readable storage medium, may be configured to store non-volatile software programs, non-volatile computer executable programs and modules, for example, the program instructions/modules corresponding to the method for managing a multi-system shared memory in the embodiments of the present application (for example, the first acquiring module 31, the first judging module 32, the first processing module 33, the second acquiring module 34 and the generating module 35 as illustrated in FIG. 11). The non-volatile software programs, instructions and modules stored in the memory 42, when being executed, cause the processor 41 to perform various function applications and data processing of a server, that is, performing the methods for managing a multi-system shared memory in the above method embodiments.

The memory 42 may also include a program storage area and a data storage area. The program storage area may store an operating system and an application implementing at least one function. The data storage area may data created according to use of the apparatus for managing a multi-system shared memory. In addition, the memory 42 may include a high speed random access memory, or include a non-volatile memory, for example, at least one disk storage device, a flash memory device, or another non-volatile solid storage device. In some embodiments, the memory 42 optionally includes memories remotely configured relative to the processor 41. These memories may be connected to the apparatus for managing a multi-system shared memory over a network. Examples of the above network include, but not limited to, the Internet, Intranet, local area network, mobile communication network and a combination thereof.

One or more modules are stored in the memory 42, and when being executed by the at least one processor 41, perform the method for managing a multi-system shared memory according to any of the above method embodiments, for example, performing steps 11 to 15 in the method as illustrated in FIG. 2, steps 11 to 16 in the method as illustrated in FIG. 7 and steps 11 to 13 in the method as illustrated in FIG. 8, and steps 21 to 29 in the method as illustrated in FIG. 9; and implementing the functions of the modules 31 to 35 as illustrated in FIG. 11, and the modules 31 to 39 as illustrated in FIG. 12.

The product may perform the method according to the embodiments of the present application, has corresponding function modules for performing the method, and achieves the corresponding beneficial effects. For technical details that are not illustrated in detail in this embodiment, reference may be made to the description of the methods according to the embodiments of the present application.

An embodiment of the present application further provides a non-volatile computer readable storage medium which stores computer executable instructions. The computer executable instructions, when being executed by an electronic device, cause the electronic device to perform the method for managing a multi-system shared memory according to any of the above method embodiments, for example, performing steps 11 to 15 in the method as illustrated in FIG. 2, steps 11 to 16 in the method as illustrated in FIG. 7 and steps 11 to 13 in the method as illustrated in FIG. 8, and steps 21 to 29 in the method as illustrated in FIG. 9; and implementing the functions of the modules 31 to 35 as illustrated in FIG. 11, and the modules 31 to 39 as illustrated in FIG. 12.

An embodiment of the present application further provides a computer program product. The computer program product includes a computer program stored on a non-volatile computer readable storage medium. The computer program includes program instructions. The computer instructions, when being executed by a computer, cause the computer to perform the method for managing a multi-system shared memory according to any of the above method embodiments, for example, performing steps 11 to 15 in the method as illustrated in FIG. 2, steps 11 to 16 in the method as illustrated in FIG. 7 and steps 11 to 13 in the method as illustrated in FIG. 8, and steps 21 to 29 in the method as illustrated in FIG. 9; and implementing the functions of the modules 31 to 35 as illustrated in FIG. 11, and the modules 31 to 39 as illustrated in FIG. 12.

The above described apparatus embodiments are merely for illustration purpose only. The units which are described as separate components may be physically separated or may be not physically separated, and the components which are illustrated as units may be or may not be physical units, that is, the components may be located in the same position or may be distributed into a plurality of network units. A part or all of the modules may be selected according to the actual needs to achieve the objectives of the technical solutions of the embodiments.

According to the above embodiments of the present application, a person skilled in the art may clearly understand that the embodiments of the present application may be implemented by means of hardware or by means of software plus a necessary general hardware platform. Persons of ordinary skill in the art may understand that all or part of the steps of the methods in the embodiments may be implemented by a program instructing relevant hardware. The program may be stored in a computer readable storage medium and may be executed by at least one processor. When the program runs, the steps of the methods in the embodiments are performed. The storage medium may be any medium capable of storing program codes, such as read-only memory (ROM), a random access memory (RAM), a magnetic disk, or a compact disc-read only memory (CD-ROM).

Finally, it should be noted that the above embodiments are merely used to illustrate the technical solutions of the present application rather than limiting the technical solutions of the present application. Under the concept of the present application, the technical features of the above embodiments or other different embodiments may be combined, the steps therein may be performed in any sequence, and various variations may be derived in different aspects of the present application, which are not detailed herein for brevity of description. Although the present application is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present application.

What is claimed is:

1. A method for managing a multi-system shared memory, comprising:
   upon receiving a data write instruction for writing data to the shared memory, acquiring a data size of to-be-written data that is to be written to the shared memory;
   judging whether the shared memory comprises a data block whose size matches the data size and is idle;
   if the shared memory does not comprise the data block whose size matches the data size and is idle, acquiring a first data block that has a memory size greater than the data size and is idle, such that the to-be-written data is written to the first data block;
   acquiring a remaining idle space of the first data block after the to-be-written data is written to the first data block; and
   generating a new data block based on the remaining idle space.

2. The method according to claim 1, further comprising:
if the shared memory comprises the data block whose size matches the data size and is idle, acquiring a second data block whose size matches the data size, such that the to-be-written data is written to the second data block.

3. The method according to claim 1, wherein the to-be-written data is written to an address space of the first data block, wherein the address space is a contiguous address space.

4. The method according to claim 3, wherein a header address of the contiguous address space is the same as a header address of the address space of the first data block, or a tail address of the contiguous address space is the same as a tail address of the address space of the first data block.

5. The method according to claim 1, wherein when the shared memory comprises at least two data blocks, the at least two data blocks of the shared memory are managed based on a circulation link list or a bidirectional link list.

6. The method according to claim 5, wherein when the at least two data blocks of the shared memory are managed based on the bidirectional link list, a control information header portion of each data block in the at least two data blocks of the shared memory comprises an offset value of the data block, an offset value of a previous data block of the data block, an offset value of a following data block of the data block, state information of the data block and length information and synchronization information of the data block.

7. The method according to claim 1, further comprising:
upon receiving a data release instruction for releasing the to-be-written data from the shared memory, releasing a data block storing the to-be-written data.

8. The method according to claim 7, further comprising:
judging whether a previous data block of the data block which is released and a following data block of the data block which is released are idle; and
combining the data block that is judged as idle with the data block from which the to-be-written data is released.

9. An electronic device, comprising:
at least one processor; and
a memory communicably connected to the at least one processor; wherein
the memory stores an instruction program executable by the at least one processor, wherein, the instruction program, when being executed by the at least one processor, causes the at least one processor to perform the steps of:
upon receiving a data write instruction for writing data to the shared memory, acquiring a data size of to-be-written data that is to be written to the shared memory;
judging whether the shared memory comprises a data block whose size matches the data size and is idle;
if the shared memory does not comprise the data block whose size matches the data size and is idle, acquiring a first data block that has a memory size greater than the data size and is idle, such that the to-be-written data is written to the first data block;
acquiring a remaining idle space of the first data block after the to-be-written data is written to the first data block; and
generating a new data block based on the remaining idle space.

10. The electronic device according to claim 9, wherein, the instruction program, when being executed by the at least one processor, causes the at least one processor to further perform the steps of:
if the shared memory comprises the data block whose size matches the data size and is idle, acquiring a second data block whose size matches the data size, such that the to-be-written data is written to the second data block.

11. The electronic device according to claim 9, wherein the to-be-written data is written to an address space of the first data block, wherein the address space is a contiguous address space.

12. The electronic device according to claim 11, wherein a header address of the contiguous address space is the same as a header address of the address space of the first data block, or a tail address of the contiguous address space is the same as a tail address of the address space of the first data block.

13. The electronic device according to claim 9, wherein when the shared memory comprises at least two data blocks, the at least two data blocks of the shared memory are managed based on a circulation link list or a bidirectional link list.

14. The electronic device according to claim 13, wherein when the at least two data blocks of the shared memory are managed based on the bidirectional link list, a control information header portion of each data block in the at least two data blocks of the shared memory comprises an offset value of the data block, an offset value of a previous data block of the data block, an offset value of a following data block of the data block, state information of the data block and length information and synchronization information of the data block.

15. A non-volatile computer-readable storage medium, wherein the computer-readable storage medium stores computer-executable instructions, which, when being executed by a computer, cause the computer to perform the steps of:
upon receiving a data write instruction for writing data to the shared memory, acquiring a data size of to-be-written data that is to be written to the shared memory;
judging whether the shared memory comprises a data block whose size matches the data side and is idle;
if the shared memory does not comprise the data block whose size matches the data size and is idle, acquiring a first data lock that has a memory size greater than the data size and is idle, such that the to-be-written data is written to the first data block;
acquiring a remaining idle space of the first data block after the to-be-written data is written to the first data block; and
generating a new data block based on the remaining idle space.

16. The non-volatile computer-readable storage medium according to claim 15, wherein, the computer-executable instructions, which, when being executed by a computer, cause the computer to perform the steps of:
if the shared memory comprises the data block whose size matches the data size and is idle, acquiring a second data block whose size matches the data size, such that the to-be-written data is written to the second data block.

17. The non-volatile computer-readable storage medium according to claim 15, wherein the to-be-written data is written to an address space of the first data block, wherein the address space is a contiguous address space.

18. The non-volatile computer-readable storage medium according to claim 17, wherein a header address of the contiguous address space is the same as a header address of the address space of the first data block, or a tail address of the contiguous address space is the same as a tail address of the address space of the first data block.

19. The non-volatile computer-readable storage medium according to claim 15, wherein when the shared memory comprises at least two data blocks, the at least two data blocks of the shared memory are managed based on a circulation link list or a bidirectional link list.

20. The non-volatile computer-readable storage medium according to claim 19, wherein when the at least two data blocks of the shared memory are managed based on the bidirectional link list, a control information header portion of each data block in the at least two data blocks of the shared memory comprises an offset value of the data block, an offset value of a previous data block of the data block, an offset value of a following data block of the data block, state information of the data block and length information and synchronization information of the data block.

* * * * *